Aug. 18, 1959    L. C. DERMOND    2,900,167
FUEL INJECTION METERING VALVE
Filed March 14, 1957    2 Sheets-Sheet 1
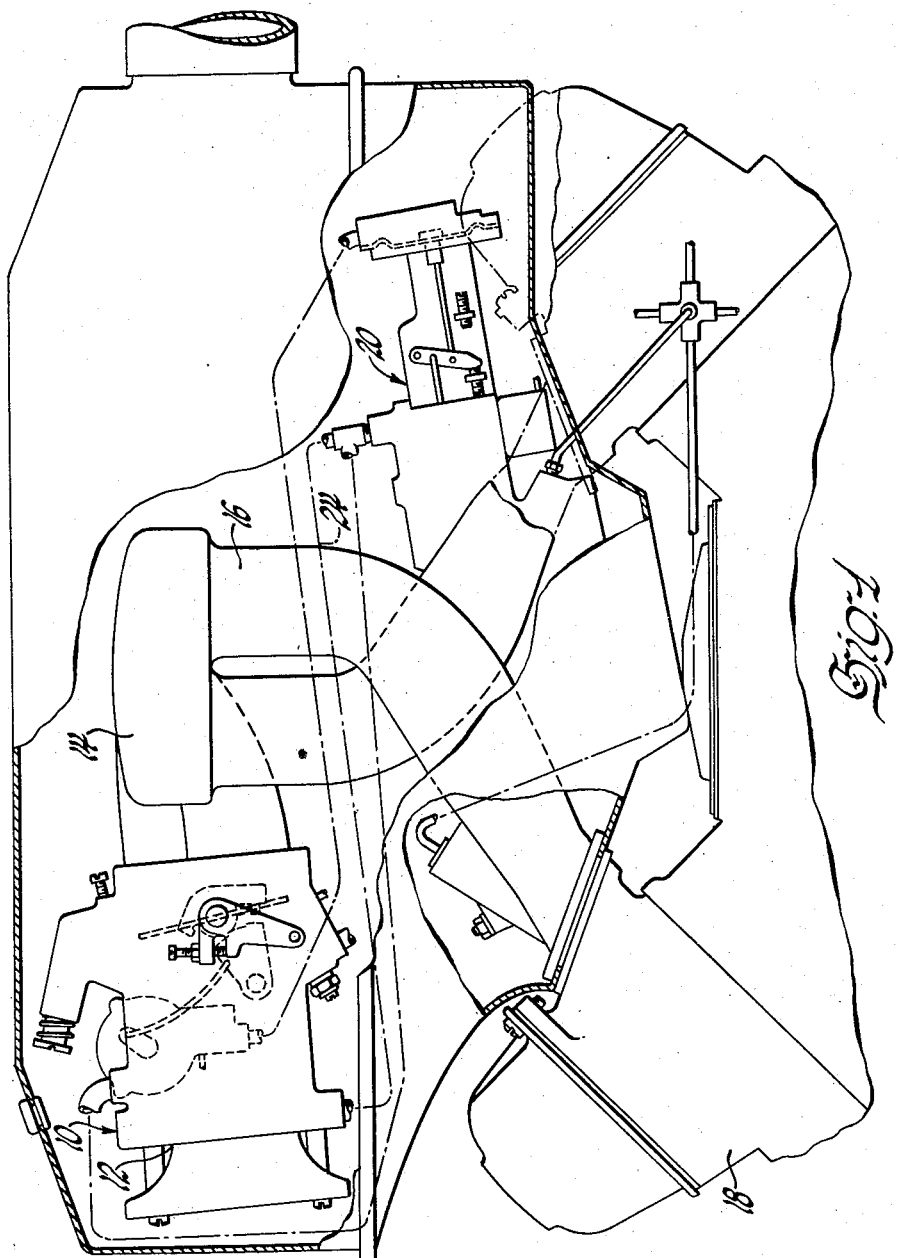
INVENTOR.
Lawrence C. Dermond
BY
R. P. Barnard
ATTORNEY

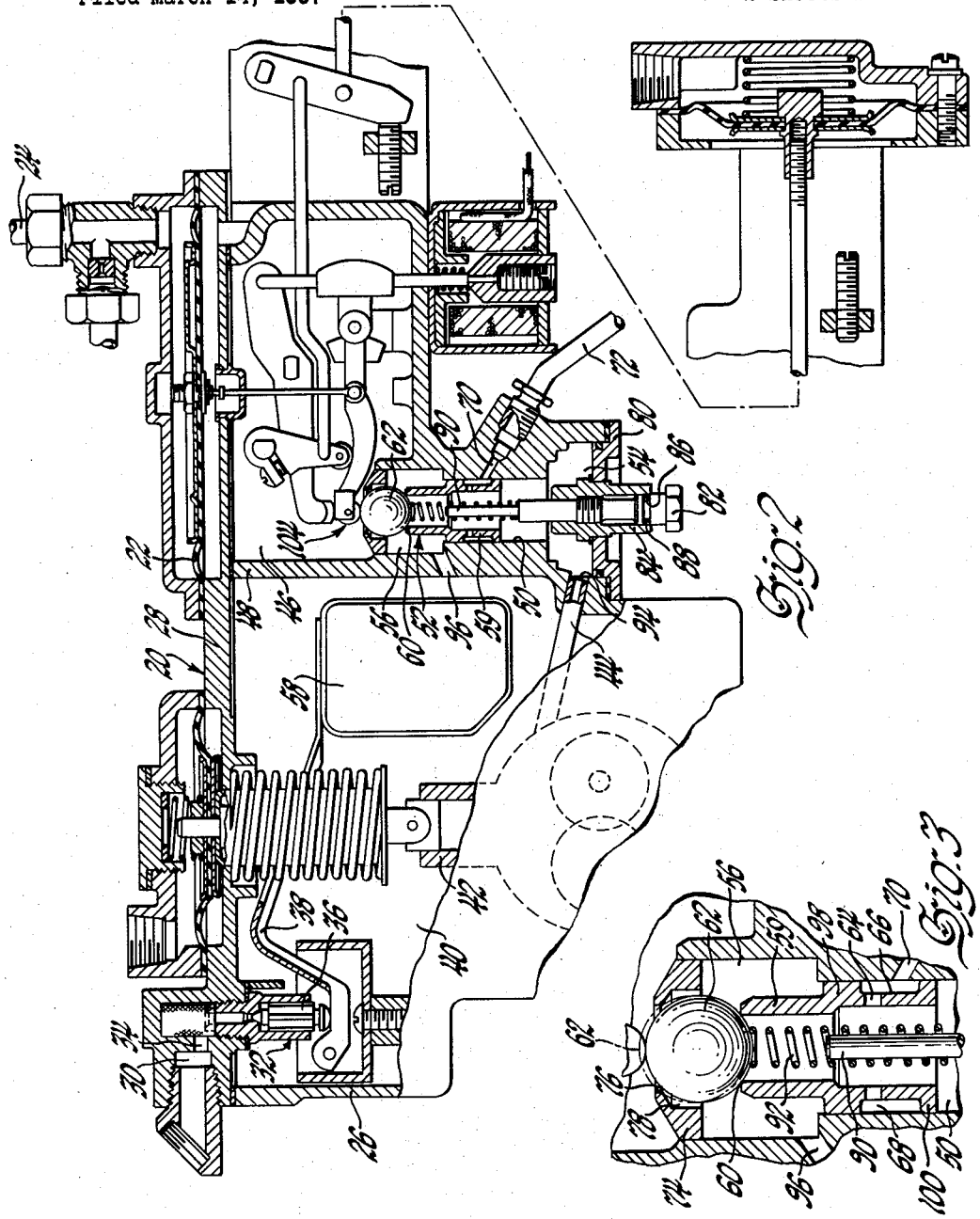

United States Patent Office 2,900,167
Patented Aug. 18, 1959

2,900,167

FUEL INJECTION METERING VALVE

Lawrence C. Dermond, Rochester, N.Y., assignor to General Motors Corporation, Detroit, Mich., a corporation of Delaware Application March 14, 1957, Serial No. 646,081

3 Claims. (Cl. 251—321)

The present invention relates to a fuel metering system in which is embodied an improved type of fuel metering valve. In fuel metering systems of the fuel injection type the precise measurement and flow of fuel is a critical factor in the achievement of satisfactory operation. While each of the components of such fuel metering systems is important, it has been found that the fuel metering valve has heretofore represented a sensitive element subject to malfunctioning. It is through the fuel metering valve that the correct quantity of fuel must flow to the cylinders at precisely the right time if the engine is to respond properly to operator demand. With the sleeve type metering valves as shown in Serial No. 608,892 Ransom and Zimmerman, filed September 10, 1956, now Patent No. 2,843,099 issued July 15, 1958, there is a great susceptibility to plugging of the peripherally disposed spill ports, sticking of the sliding sleeve member and a general inertia of the sleeve to movement. Anyone of these factors can cause a malfunctioning of the fuel injection system and it is to eliminate these factors that the present metering valve has been developed.

It is the purpose of the present invention to provide a fuel metering valve which uses a ball type valve element disposed upon an annular seat. In this way flow around the movable ball member is through an annular opening rather than through a plurality of relatively small ports and as a consequence of which there is, in the present device, no tendency toward clogging. In addition, through the use of the unique valve arrangement in which the ball seats upon an annular seat there is no friction between the ball and seat and hence there is no tendency of the valve to stick in one position or another. Further, the lack of sliding contact between the valve and its seat reduces the inertia of the valve making the same respond more quickly to changes in engine operating characteristics. Also due to the greatly increased flow area through an annular opening the valve is more responsive to operating changes since the ball valve can change the fuel flow rate by moving a shorter distance than is the case with a sleeve type valve which bypasses fuel through a plurality of small ports.

While the above and other operating characteristics represent distinct improvements over the sleeve type metering valves there is the further and commercially important improvement of a more simply assembled and more cheaply manufactured type valve resulting from the present construction.

A detailed description of the subject metering valve follows in the appended specification and claims.

In the drawings:

Figure 1 discloses in general a fuel injection system within which the subject valve may be incorporated;

Figure 2 is an enlarged sectional view of the fuel metering system; and

Figure 3 is an enlarged sectional view of the subject metering valve.

The fuel metering system in general functions in the same manner as that described in the aforenoted copending application Serial No. 608,892, therefore, the system will be described in detail only insofar as it is necessary to illustrate the operation of the present metering valve.

In Figure 1 a fuel induction passage is indicated generally at 10 and includes a venturi 12 therewithin. The air entering the fuel induction passage 10 flows to a plenum chamber 14 from which individual intake passages or ram pipes 16 deliver air to the individual cylinders of the engine indicated generally at 18. A fuel metering device is indicated at 20 and is shown in detail in Figure 2. Device 20 includes a control diaphragm 22 to the upper side of which venturi vacuum is delivered from a conduit 24. The fuel supplying and metering device 20 is mounted in a housing which includes a case 26 and cover 28. A conduit 30 is formed in cover 28 and is supplied with fuel from a low pressure make-up pump, not shown. A float control valve mechanism 32 is also disposed in cover 28 and is in communication with conduit 30 through a passage 34 to which filtered fuel is supplied in accordance with the vertical position of the valve member 36 as determined by the position of a pivoted float actuated arm 38. In the normal manner, as float 58 is raised and lowered the valve 36 will shut off or admit fuel into a fuel reservoir 40 provided in casing 26.

A constant displacement type pump 42 which is driven at engine speed is mounted in the fuel reservoir 40 and is adapted to pump fuel from the reservoir to a conduit 44 leading generally to a metering chamber 46.

Chamber 46 is separated from the fuel reservoir 40 by a perforated partition 48. A bore 50 is formed in the chamber 46 portion of casing 26 and is adapted to support therein a fuel metering valve 52, the details of which will now be described. The bore 50 has a plurality of varying sized counterbores, the largest of which 54 is disposed at the lower end of the bore and the other 56 disposed at the upper end. A sleeve 59 is fixed within bore 50 intermediate the enlarged portions 54 and 56. The upper end of the sleeve 59 includes an annular seat 60 upon which a ball valve member 62 is adapted to be supported. Sleeve 59 has a plurality of peripherally disposed ports 64 which communicate the interior of the sleeve with a peripherally relieved portion 66 which with the bore 50 defines an annular fuel chamber 68. Chamber 68 is in communication with a port 70 formed in the bore 50 and to which port a fuel distributing conduit 72 is connected.

A perforate end cap 74 is fixed within the upper end of counterbore 56 and includes a central opening 76 therethrough. Cap 74 is counterbored at 78 to a diametral size which permits the ball valve member 62 to project within the end cap. The opening 76 of the end cap is of a size permitting a limited portion of the ball valve 62 to project therethrough while at the same time maintaining the ball valve member in its assembled relation to sleeve 59.

A second end cap 80 is removably mounted in the lower end of the bore 50 and has a stud 82 centrally mounted therewithin. Stud 82 is threadably mounted within an adaptor plug 84 in turn secured to end cap 80 in such a way as to be axially adjustable within the adaptor for reasons which will subsequently be considered. The lower end of stud 82 is circumferentially relieved at 86 to accommodate an O-ring type seal 88 which insures against the leakage of fuel past the adjustable stud. The upper end of stud 82 is radially relieved to provide a portion 90 upon which a spring member 92 is supported. The other end of spring 92 biases against the ball valve 62 so as to urge the valve off its seat toward the end cap 74.

A port 94 is formed through bore 50 intermediate the ball member 62 and the end cap 80. Pump output conduit 44 communicates with port 94 and delivers fuel under pressure proportional to engine speed to the valve bore 50. The fuel flows from port 94 through bore 50 to the circumferential ports 64 in sleeve 59 to chamber 68 and hence to the fuel distributing passage 72. An additional port 96 is formed in counterbore portion 56 of bore 50 intermediate the end cap 74 and the ball valve 62. Sleeve 59 has a land portion 98 which with land 100 supports the sleeve within bore 50 and insures that fuel within counterbore 56 will not flow into annular chamber 68. Port 96 returns excess fuel in counterbore 56 to the reservoir 40.

Ball valve member 62 and annular seat 60 in conjunction with counterbore 56 and port 96 constitute a fuel bypass system for controlling the quantity of fuel delivered to annular chamber 68. Thus it is apparent that if ball valve 62 is seated upon seat 60 all of the fuel supplied through port 94 will leave the valve mechanism through outlet port 70 and ultimately be distributed to the cylinders of the engine. However, as ball valve 62 is lifted off of its seat a progressively larger quantity of fuel will be bypassed around the valve and back to the reservoir through port 96. The amount of axial movement of valve 62 from its seat 60 is determined by the force of spring 92, the pressure of the fuel within bore 50 as opposed by a force which is proportional to the mass of air flowing through the venturi 12. This latter force is applied to ball valve 62 through a lever mechanism 104 which is controlled by the metering diaphragm 22 as described in the aforenoted copending application. It will suffice for the purposes of the present invention to say that as the mass of air flowing through venturi 12 increases an increased vacuum force is transmitted through conduit 24 to the upper side of diaphragm 22 moving the latter upwardly and at the same time causing lever mechanism 104 to move the ball valve 62 downwardly toward its seat 60 on sleeve 58.

As described in the aforenoted copending application, pump 42 supplies an excessive amount of fuel to the metering valve 52 so that during all normal operation ball valve 62 is off its seat 60, as indicated by the dotted lines in Figure 3, and fuel is being bypassed back to reservoir 40. The quantity of fuel being bypassed, however, varies in accordance with the differential effect of the forces acting on ball valve 62, as already described.

As already noted, spring supporting stud 82 is threadably mounted within end cap 80. By axially adjusting the position of stud 82 relative to end cap 80, the rate of spring 92 and the force with which it urges ball valve 62 away from its seat may be varied and with it the idle fuel flow through the metering valve. In other words, as the stud 82 is threaded upwardly valve 62 will tend to move farther off its seat thereby causing more fuel to be bypassed and hence less fuel to flow to the engine's cylinders reducing the engine idling speed. Similarly, by threading the stud downwardly less fuel is bypassed correspondingly enriching the combustion charge. It is seen by adding the idle fuel adjustment feature to the spring supporting structure a separate idle fuel adjusting valve is eliminated further simplifying the over-all fuel system construction.

It may best be seen in Figure 3 that since ball valve 62 and seat 60 define an annular fuel outlet having a considerably greater flow capacity than a plurality of circumferentially spaced ports as has been previously employed. For this reason less axial movement of valve 62 is required to change the quantity of fuel bypassed than is the case with a sleeve type valve as shown in the aforenoted copending application. In thus reducing the required axial movement of ball valve 62 the metering valve 52 will be more responsive to changes in engine demand.

It is apparent that structural modifications may be made in the illustrated metering valve within the intended scope of the invention.

I claim:

1. A metering valve for a fuel injection system comprising a valve body having a bore therein, a hollow sleeve fixed within the bore and terminating at one end in an annular seat, a ball valve member disposed within said seat, a perforate cap disposed in one end of said bore proximate the ball valve member, said cap having an opening within which the ball may project, the end of said cap remote from the sleeve being restricted to prevent the ball from passing completely therethrough, an imperforate end cap disposed in the other end of said body, a spring element mounted upon the imperforate end cap and biasing said valve away from its seat, said valve being axially movable between the annular seat and the perforate end cap, said valve body having a plurality of ports formed therein including fuel inlet and outlet ports intermediate the ball valve member and the imperforate end cap, and a bypass port intermediate the ball valve and the perforate end cap.

2. A metering valve for a fuel injection system comprising a valve body having a bore therein, a counterbore formed at one end of the bore, a hollow sleeve fixed within the bore and projecting at one end into the counterbore, said projecting sleeve end terminating in an annular seat, a ball valve member coacting with said seat to control fuel flow therethrough, a perforate cap disposed in the counterbore, said cap having an opening within which the ball valve may project, the end of said cap remote from the sleeve being restricted to prevent the ball from passing completely therethrough, an imperforate end cap disposed in the other end of said body, an axially adjustable stud mounted in the imperforate end cap, a spring element supported upon the stud and biasing said valve off its seat, said valve being axially movable between the annular seat and the perforate end cap, said valve body having a plurality of ports formed therein including fuel inlet and outlet ports intermediate the ball valve member and the imperforate end cap, and a bypass port intermediate the ball valve and the perforate end cap.

3. A metering valve for a fuel injection system comprising a valve body having a bore therein, counterbores formed at the respective ends of said bore, a hollow sleeve fixed within the bore and projecting at one end into one of the counterbores, said projecting sleeve end terminating in an annular seat, a ball valve member coacting with said seat to control fuel flow therethrough, a perforate cap disposed in the counterbore receiving said sleeve, said cap having an opening within which the ball valve may project, the end of the cap remote from the sleeve seat being restricted to prevent the ball from passing completely therethrough, an imperforate end cap disposed in the other end of said body, an axially adjustable stud mounted in the imperforate end cap, a spring element supported upon the stud and biasing said valve away from its seat, said valve being axially movable between said annular seat and the perforate end cap, the portion of said sleeve mounted in the bore having a peripherally relieved portion which cooperates with said bore to define an annular chamber, an outlet port formed in said body and communicating with said chamber, a plurality of circumferentially spaced ports formed in said sleeve and communicating with said chamber, a fuel inlet port formed in said valve body and communicating with said bore, and an additional outlet port formed in the valve body and communicating with the end cap receiving counterbore, the fuel flow through said metering valve being divided between said outlet ports in accordance with the axial position of said ball valve.

References Cited in the file of this patent

UNITED STATES PATENTS 2,502,679     Stanly _____ Apr. 4, 1950
2,813,522     White et al. _____ Nov. 19, 1957